(12) United States Patent
Leuze et al.

(10) Patent No.: US 11,024,096 B2
(45) Date of Patent: Jun. 1, 2021

(54) 3D-PERCEPTUALLY ACCURATE MANUAL ALIGNMENT OF VIRTUAL CONTENT WITH THE REAL WORLD WITH AN AUGMENTED REALITY DEVICE

(71) Applicant: The Board of Trustees of the Leland Stanford Junior University, Stanford, CA (US)

(72) Inventors: Christoph Leuze, Palo Alto, CA (US); Supriya Sathyanarayana, Milpitas, CA (US); Jennifer McNab, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/861,220

(22) Filed: Apr. 29, 2020

(65) Prior Publication Data

US 2020/0342675 A1    Oct. 29, 2020

Related U.S. Application Data

(60) Provisional application No. 62/840,339, filed on Apr. 29, 2019.

(51) Int. Cl.
*G06T 19/00* (2011.01)
*G06T 7/33* (2017.01)
*G06T 7/00* (2017.01)

(52) U.S. Cl.
CPC .......... *G06T 19/006* (2013.01); *G06T 7/0012* (2013.01); *G06T 7/344* (2017.01); *G06T 2207/30201* (2013.01); *G06T 2207/30204* (2013.01); *G06T 2215/16* (2013.01); *G06T 2219/004* (2013.01)

(58) Field of Classification Search
CPC .............. G06F 2111/18; G06F 3/0481; G06F 3/04817; G06F 9/4443; G06F 3/04847; G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| | | |
|---|---|---|
| 6,753,828 B2 | 6/2004 | Tuceryan |
| 8,502,835 B1 * | 8/2013 | Meehan ................ G06F 16/58 345/633 |
| 9,405,122 B2 | 8/2016 | Wu |

(Continued)

*Primary Examiner* — Todd Buttram
(74) *Attorney, Agent, or Firm* — Lumen Patent Firm

(57) ABSTRACT

3D alignment of a virtual model and corresponding real-world object is provided. A user places virtual tags on the real-world object as viewed through an augmented reality device. By placing these tags at the positions where he perceives certain real-world landmark locations, this allows for correction of misalignments between virtual content on the AR display and the real world. In particular, the virtual model include virtual landmarks that correspond to the real-world landmarks. Thus aligning the virtual landmarks of the virtual model to the virtual tags provides accurate alignment of the virtual model to the corresponding real-world object.

14 Claims, 7 Drawing Sheets

(56) References Cited

U.S. PATENT DOCUMENTS

| | | | |
|---|---|---|---|
| 10,010,379 B1 | 7/2018 | Gibby | |
| 10,176,582 B2 | 1/2019 | Carrell | |
| 10,215,989 B2 | 2/2019 | Harrison | |
| 10,872,457 B1 * | 12/2020 | Hu | G06T 17/20 |
| 2007/0018975 A1 | 1/2007 | Chuanggui | |
| 2010/0045701 A1 | 2/2010 | Scott | |
| 2011/0190774 A1 * | 8/2011 | Nikolchev | A61B 17/56 |
| | | | 606/90 |
| 2012/0218263 A1 | 8/2012 | Meier | |
| 2013/0328762 A1 | 12/2013 | McCulloch | |
| 2016/0157938 A1 | 6/2016 | Breisacher | |
| 2016/0182877 A1 | 6/2016 | DeLuca | |
| 2017/0337741 A1 * | 11/2017 | Fradet | G06T 11/001 |
| 2018/0005441 A1 * | 1/2018 | Anderson | G06T 19/006 |
| 2018/0218538 A1 * | 8/2018 | Short | G06F 3/011 |
| 2018/0303558 A1 | 10/2018 | Thomas | |
| 2019/0011703 A1 | 1/2019 | Robaina | |
| 2019/0279433 A1 * | 9/2019 | Borke | G06T 7/30 |
| 2019/0380792 A1 * | 12/2019 | Poltaretskyi | G06N 3/0454 |
| 2020/0342675 A1 * | 10/2020 | Leuze | G06T 7/0012 |

\* cited by examiner

3D-PERCEPTUALLY ACCURATE MANUAL ALIGNMENT OF VIRTUAL CONTENT WITH THE REAL WORLD WITH AN AUGMENTED REALITY DEVICE

CROSS REFERENCE TO RELATED APPLICATIONS

This application claims the benefit of U.S. provisional patent application 62/840,339, filed on Apr. 29, 2019, and hereby incorporated by reference in its entirety.

GOVERNMENT SPONSORSHIP

This invention was made with Government support under contract MH116484 awarded by the National Institutes of Health. The Government has certain rights in the invention.

FIELD OF THE INVENTION

This invention relates to visualization of a 3D virtual model superposed on a corresponding real-world object using an augmented reality (AR) device.

BACKGROUND

Many augmented reality applications require alignment of the virtual content with the real world, e.g. visualization of a brain MRI rendering on a patient's head or of a patient's bone rendered on his real-world leg. While this problem has been solved on 2D displays with see-through displays, accurate alignment in 3D remains challenging because of the additional depth component of the display. One substantial difficulty encountered with 3D alignment is that depth perception varies from user to user. Accordingly, it would be an advance in the art to provide improved methods for 3D alignment.

SUMMARY

In this work, a user places virtual tags on a real-world object as viewed through an AR device. By placing these tags at the positions where he perceives certain real-world landmark locations, this allows for correction of misalignments between virtual content on the AR display and the real world. In particular, the virtual model include virtual landmarks that correspond to the real-world landmarks. Thus aligning the virtual landmarks of the virtual model to the virtual tags provides accurate alignment of the virtual model to the corresponding real-world object.

An exemplary embodiment is a software application that uses a see-through augmented reality display and a controller that is tracked by the augmented reality display so that the controller's pose is known by the augmented reality device. The software application creates a virtual controller that is projected on the real-world controller with a small virtual cursor, which has no real-world pendant, extruding at the top of the controller. Using the virtual controller, the user now places virtual tags around a real-world object such as a patient's head or body at the locations where he perceives the real-world landmarks. The virtual object such as the brain MRI rendering is then registered to the real-world object with the help of these landmarks and a landmark-based registration. Using this method we have shown that we can achieve accuracies of less than 5 mm of a patient's anatomical MRI data placed on the patient using a see-through AR display.

One application is for AR neuronavigation of Transcranial Magnetic Stimulation (TMS) (non-invasive brain stimulation treatment used e.g. to treat depression). We have tested this method and have shown accuracies of less than 5 mm for locating brain areas of interest using an AR display. It is a useful tool for many medical applications where a virtual model that contains more than three landmarks needs to be aligned to a real-world object that contains the same visible landmarks. Another application would be registration of a body avatar or volumetric medical imaging data to a real-world body for surgical planning and navigation. But there are also non-medical applications such as registration of equipment during assembly or maintenance tasks.

Significant advantages are provided. Most current methods for aligning virtual with real-world objects rely on tracking of the real-world object, transformation of the real-world pose into the virtual object space and then rendering of the virtual object at the transformed location. This is a convenient approach that works extremely well for 2D screens, where the virtual object can be drawn exactly at the desired 2D locations, leading to perfect alignment. This method also can work well on see-through AR displays if the display is accurately configured for the specific user and the tracking and transformation is very accurate.

However, in practice the AR display is most often not configured exactly right for each user with varying pupillary distances, varying positions of the eyes behind the AR display and other individual anatomical variations. This often leads to inaccurate alignment between the virtual model and the real-world object, making such an overlay impossible for applications that require a high accuracy such as medical applications. Another currently used method is to manually move and rotate the virtual object around until the user perceives it aligned accurately with the real world. This approach is, however, time-consuming and makes it difficult to reach high accuracies. Our method is a simple solution to a complicated spatial computing problem for registering virtual content to the real world. Our method can very accurately provide an initial alignment of the virtual object to the real object.

DETAILED DESCRIPTION

An exemplary embodiment is a virtual-to-real alignment method having the following steps:

1) providing a virtual 3D model (e.g., 102) of a real-world object (e.g., 106), where the virtual 3D model includes two or more virtual landmarks (e.g., 104*a-e*) disposed at locations in the virtual 3D model that correspond to real-world landmarks of the real-world object;

2) viewing the real-world object through a see-through augmented reality (AR) device (e.g., 202). Here the AR device is configured to display a virtual cursor (e.g., 208) superposed on the real-world object, where a displayed position of the cursor on the real-world object can be manually adjusted by a user, and where a location of the virtual cursor is known to the AR device;

3) for two or more of the virtual landmarks—manually positioning the virtual cursor on a corresponding real-world landmark of the real-world object as seen through the see-through AR display, followed by tagging to provide a virtual tag (e.g., 210a-e) on the corresponding real-world landmark of the real-world object. Here the location of the virtual tag is known to the AR device, which means that the AR device also knows the location where the user perceives the corresponding real-world landmark of the real-world object; and 4) automatically aligning the virtual 3D model of the real-world object to the real-world object by relying at least partially on relating virtual landmarks to virtual tags that relate to the same real-world landmarks of the real-world object (e.g., correspondence between 104a-e and 210a-e on FIG. 3). These steps are described in greater detail below with reference to FIGS. 1-4.

The real-world object can be a part of a patient's anatomy. In such cases, the virtual 3D model can be a corresponding 3D medical image of the patient (i.e., a patient-specific virtual model). Alternatively, the 3D model can be a generic anatomical model corresponding to the part of the patient's anatomy. The real-world object can also be any 3D object that needs to be aligned with a corresponding 3D virtual model.

Alignment of the virtual model to the real-world object can be done by performing a landmark-based rigid registration). Rigid registration allows 6 degrees of freedom including translation (e.g., x, y, z) and rotation (e.g., yaw, pitch and roll) of the virtual model.

Alignment of the virtual model to the real-world object can also be done by performing a landmark-based affine registration). Affine registration allows 12 degrees of freedom including translation (e.g., x, y, z), rotation (e.g., yaw, pitch and roll), scaling (3 degrees of freedom) and shear (3 degrees of freedom) of the virtual model.

Figure 1:
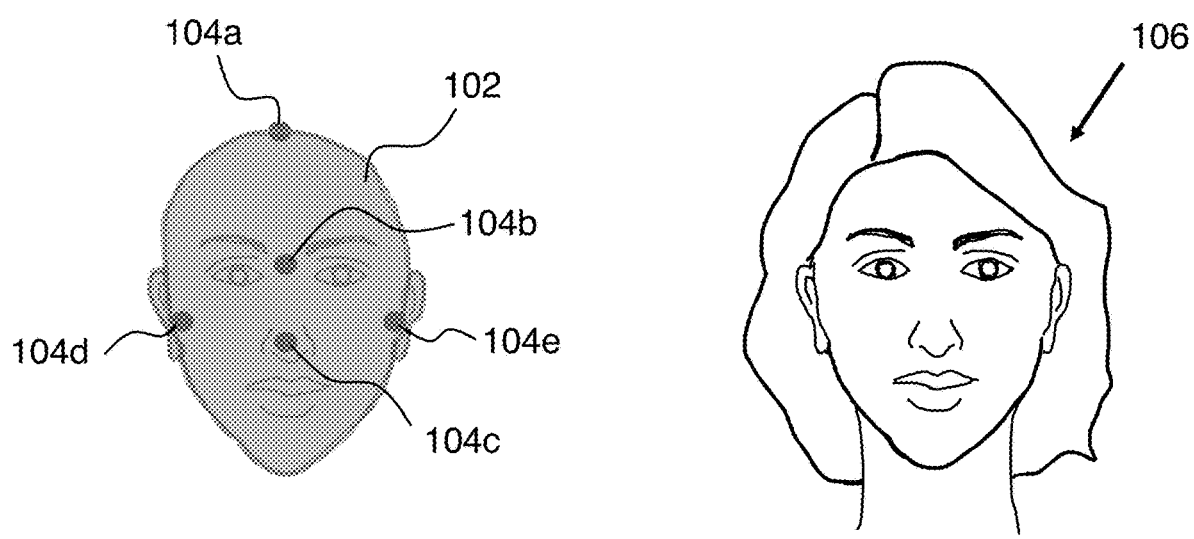
FIG. 1 shows an exemplary virtual model and corresponding real-world object.

FIG. 1 shows an exemplary virtual model and corresponding real-world object. In this example, a 3D virtual model 102 of a real-world object 106 (e.g., the patient's head) is obtained. Virtual landmarks 104a, 104b, 104c, 104d, 104e are placed at clearly visible anatomical landmarks of the virtual model 102. In this example, facial features are used as landmarks such that 104a, 104b, 104e, 104d, and 104e correspond to top of the head, bridge of the nose, tip of the nose, right ear and left ear, respectively. Any other set of landmark features could also be used, provided a sufficient number of landmarks are used and they are clearly visible on the corresponding real-world object. For example bone structures that can be identified from the outside such as skull bones, collar bones, shoulders, clearly identifiable skin structures such as facial features, nipples, navel, and other anatomical landmarks that can be identified on both the real-world body and the virtual model could be used.

Figure 2:
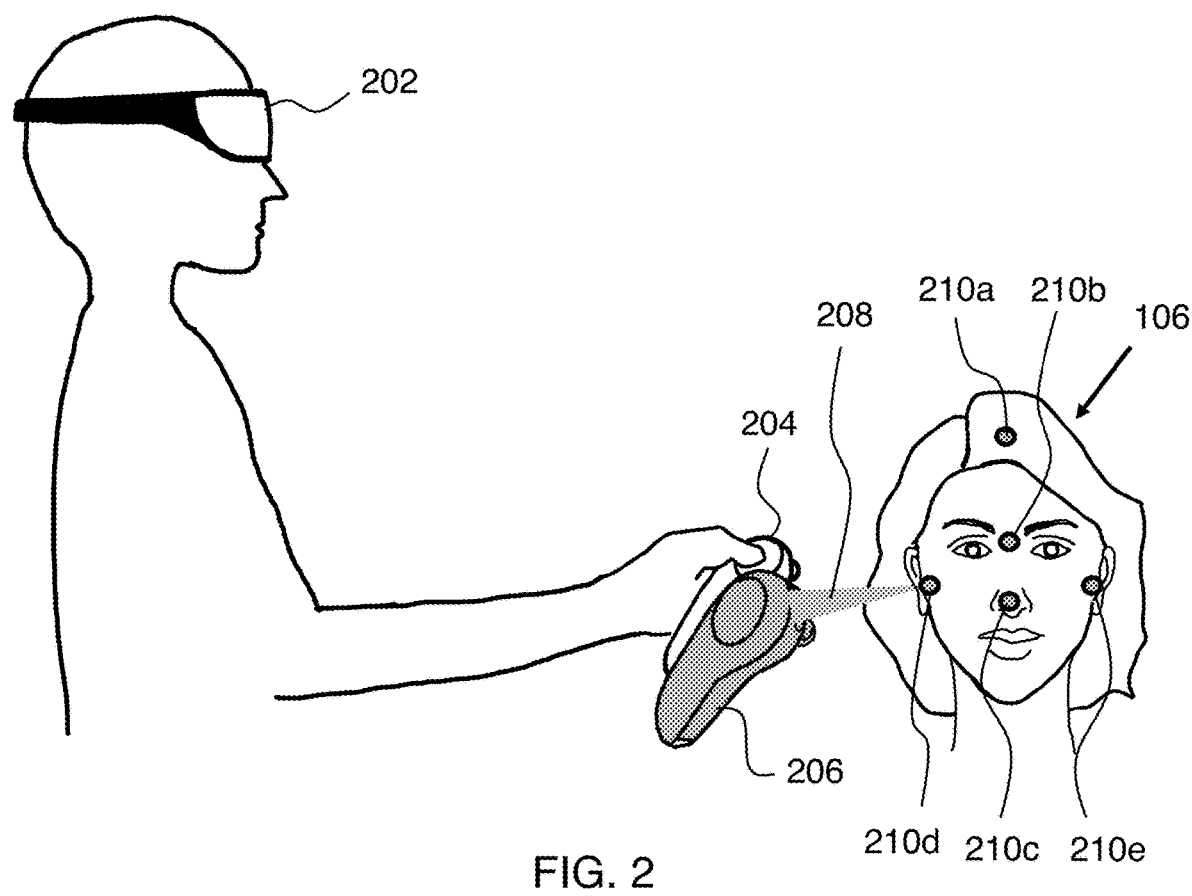
FIG. 2 shows an example of tagging a real-world object using a see-through AR device.

FIG. 2 shows an example of tagging a real-world object using a see-through AR device. Here an operator wears an augmented reality see-though device 202 and places virtual tags 210a-e at the real world anatomical landmarks corresponding to the virtual landmarks 104a-e of the virtual model 102. These tags can be positioned relative to the real-world object 106 by using an AR controller 204 to provide a cursor 208. Here 206 is a virtual representation of the real controller 204. Alignment of the virtual controller 206 to real controller 204 only has to be "good enough" so that the virtual controller appears close to the real controller within a few cm. A higher overlay accuracy is not necessary, allowing trackers such as electromagnetic polhemus trackers or image trackers to track the real controller pose. Instead of using a real controller the virtual cursor can also be controlled using the hand or fingers, with the virtual cursor e.g. protruding from the index finger tip. Thus the controller of the AR device can be user hand and/or fingers and the virtual cursor can be related to user hand and/or finger position.

Preferably the virtual tags are visible in the AR device, to give a visible indication of how accurately the tagging was done. Thus if a tag is placed incorrectly, the user can see the problem and can fix it before alignment is attempted. In this example, the cursor is provided by an AR controller configured to display a virtual pointer having the cursor at its tip.

Figure 3:
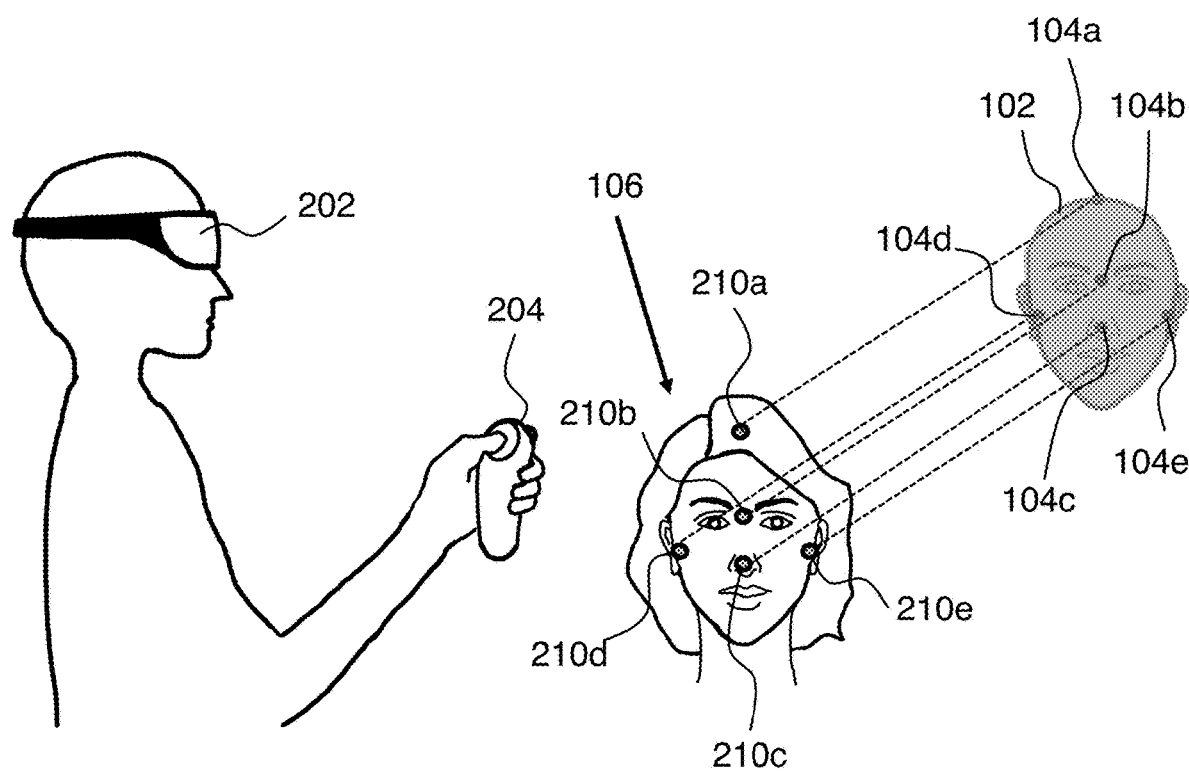
FIG. 3 shows an example of aligning a virtual model to a real-world object by matching virtual landmarks on the virtual model to tags on the real-world object.

FIG. 3 shows an example of aligning a virtual model to a real-world object by matching virtual landmarks on the virtual model to tags on the real-world object. The virtual model 102 of the patient's anatomy of interest is registered to the real-world object 106 by registering the virtual landmarks 104a-e placed on the virtual model 102 to the virtual tags 210a-e placed by the operator at the corresponding real world anatomical locations.

Figure 4:
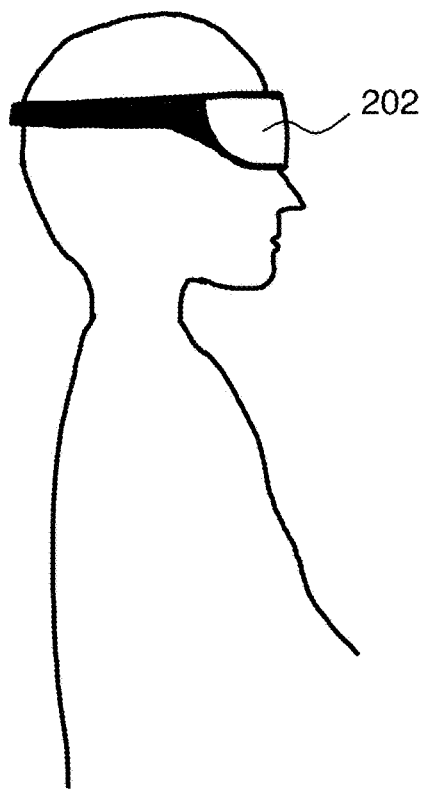
FIG. 4 shows an example of a virtual model superposed on the corresponding real-world object as a result of alignment as described herein.
Figure 4:
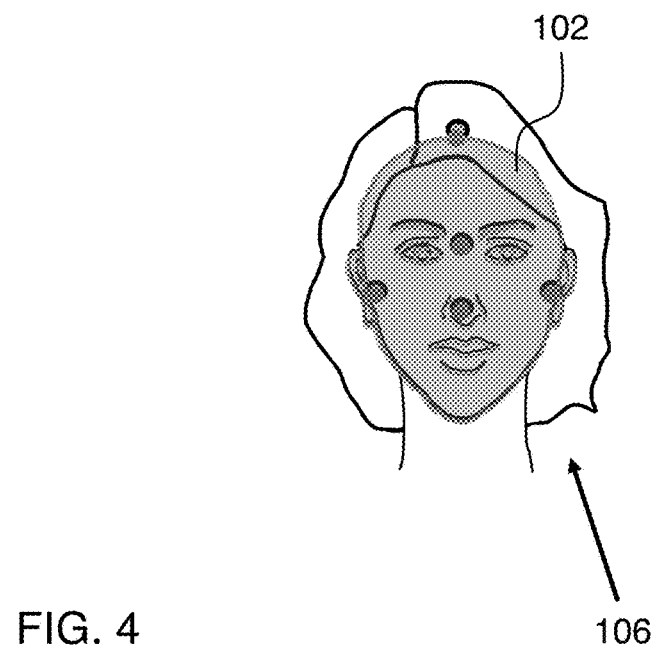

FIG. 4 shows an example of a virtual model superposed on the corresponding real-world object as a result of alignment as described herein. Here the virtual model 102 of the patient's anatomy of interest is now aligned to the real-world object 106 with accuracy depending on the placement accuracy of virtual landmarks 104a-e and virtual tags 210a-e. Thus a user viewing this scene through AR device 202 will see virtual model 102 accurately superimposed on real-world object 106. Providing this kind of accurately superposed display is a significant objective of this work, and has many applications as described herein.

As indicated above, the initial alignment of the virtual model to the real-world object (as on FIG. 3) can be done by performing a landmark-based rigid or affine registration. Such an initial alignment can be further refined by the user by manually moving the virtual model with a user interface of the AR device.

Figure 5:
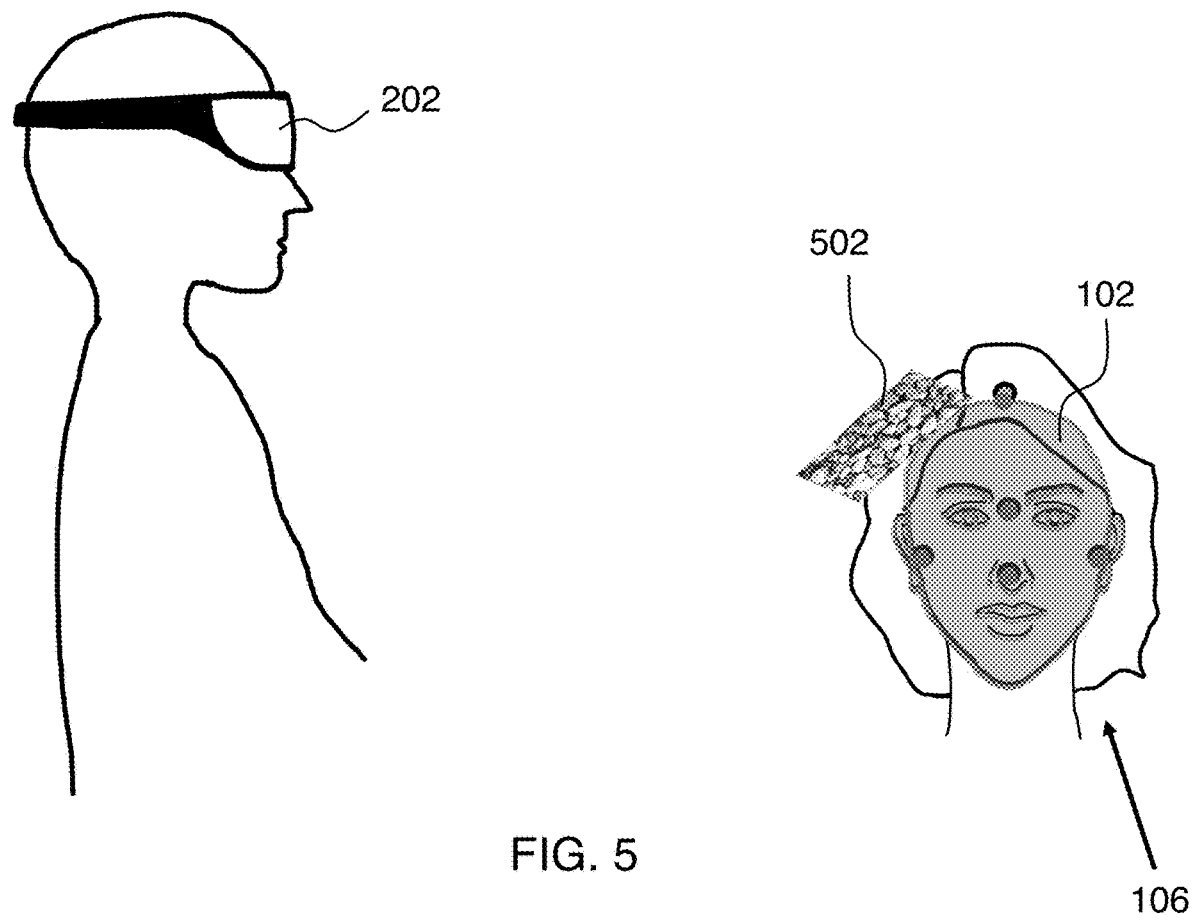
FIG. 5 shows an example of a real-world marker for motion tracking.

FIG. 5 shows an example of a real-world marker for motion tracking. Such motion tracking can be done on the real-world object, and then the resulting tracking information can be used to update the display of the virtual model to preserve the superposition of virtual model 102 on real-world object 106 shown on FIG. 5. Here a real world marker 502 is disposed on real-world object 106. For simplicity only a single real-world marker is shown, although in practice several real-world markers are usually used to provide tracking. Such real-world markers can be image markers or reflective spheres.

Alternatively, markerless tracking of the real-world object can be employed for real-world objects having landmarks (e.g., anatomical landmarks) that can serve as tracking markers. Because the principles of such object tracking (both markerless and with markers) are well known in the art, further details on tracking per se are not provided here.

When real-world object 106 moves, its motion can be tracked as described above. The result of such object tracking is a transformation relating original and final poses (i.e., positions and orientations) of the real-world object. By applying that same transformation to the virtual model, the resulting corrected virtual model will be superposed with the real-world object when the real-world object is in its final position. In other words, there is no need to redo the tagging and alignment of FIGS. 2 and 3. For sufficiently slow motion of real-world object 106, tracking the real-world object and correcting the virtual model can be done in real time, such that a user looking through AR device 202 sees the accurate superposition of FIG. 5 while real-world object 106 moves. This will allow the virtual model to stay aligned with the real-world object even if the real-world object pose changes with respect to the pose it had during tag placement and registration.

For model-based markerless tracking the dimensions of the real-world object need to be known to accurately calculate the pose of the real-world object. These dimensions can be extracted either directly from the virtual model or they can be defined by the virtual tags.

To remove jitter, it is possible to link the real-world marker transformation to the transformation of the virtual model via a virtual spring joint. With such a virtual spring joint the transformation of the virtual model is only gradually updated to the transformation of the real-world marker with the update rate being proportional to the difference between both transformations.

Figure 6:
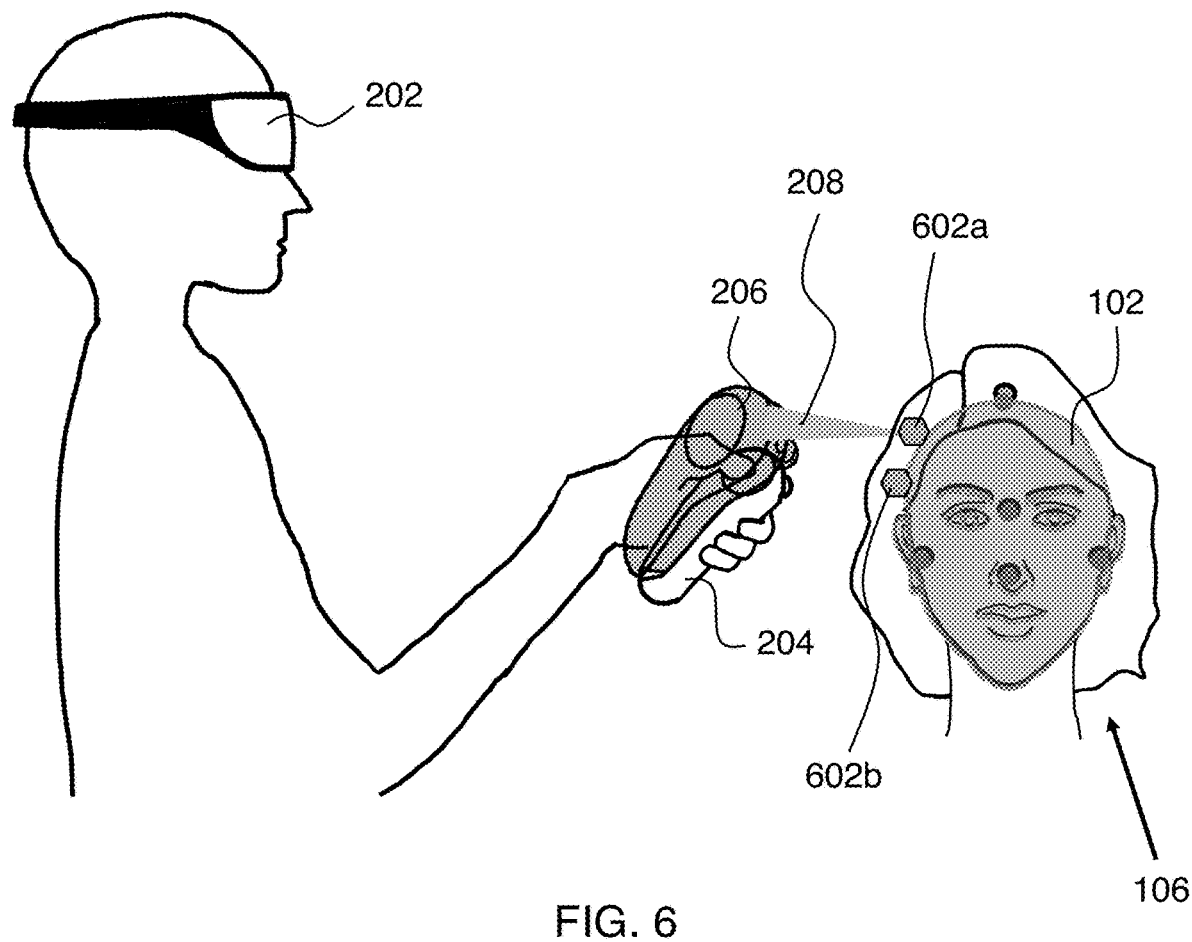
FIG. 6 shows an example of using auxiliary virtual tags to provide additional capabilities.

FIG. 6 shows an example of using auxiliary virtual tags to provide additional capabilities. Auxiliary virtual tags 602a-b can be placed to mark real world locations of the patient. These auxiliary tags are not used to align the virtual model 102 to the corresponding real-world object 106. Instead they have various other applications. FIG. 6 shows two such auxiliary tags, but any number of these tags can be employed, depending on the application. The locations of these auxiliary tags are linked to the virtual model. Thus, after alignment of the virtual model to the real-world object using the virtual tags, the auxiliary tags are also automatically aligned to the real-world object.

A major application of auxiliary virtual tags is to document therapy, as in the following examples. In many of these cases, it will be particularly valuable to store patient-specific auxiliary tag information such that it can be used from one therapy session to another therapy session. This will avoid repetition of time-consuming procedures such as mapping out responses etc. Instead, each session can begin with alignment of the virtual model to the patient as described above. All information from prior therapy sessions that was registered using auxiliary tags is then available in the current session.

1) TMS—Motor threshold estimation: During motor threshold estimation the clinician moves the coil to different locations on the patient's head, trying to find the spot where a motor response with minimal electromagnetic power can be induced. By placing virtual tags at real world locations where stimulation occurred, the clinician can speed up and get better results during the motor threshold estimation.

2) TMS—Mapping: There are a variety of TMS applications where the TMS stimulation is used to map which brain areas are affected, e.g. by stroke. Placing virtual tags on the positions where activation of a specific muscle occurred will speed up the mapping procedure and help the clinician to ensure that all relevant cortical structures were mapped.

3) Aphasia rehabilitation: TMS treatment is currently being explored as a tool to treat stroke patients who experience language disorders. During aphasia TMS treatment, the best response region is measured that leads to the biggest improvement in naming certain objects. Placing tags during this search can lead to a faster and more accurate localization of this region.

4) For applications where a virtual body avatar that is based on a generalized atlas or modeling approach is registered to the body to estimate the location of internal anatomy, the real location of internal organs can differ from the estimated location. If the real location of internal organs is revealed during the medical procedure, virtual tags can be placed at these locations to update and improve the virtual body avatar.

Any auxiliary tags that are placed on the real-world object after registration (e.g., to mark a specific area) can be linked to the virtual model. Updating the pose of the virtual model as described above in connection with FIG. 5 will then also automatically update the position of the tags on the real-world object.

Figure 7:
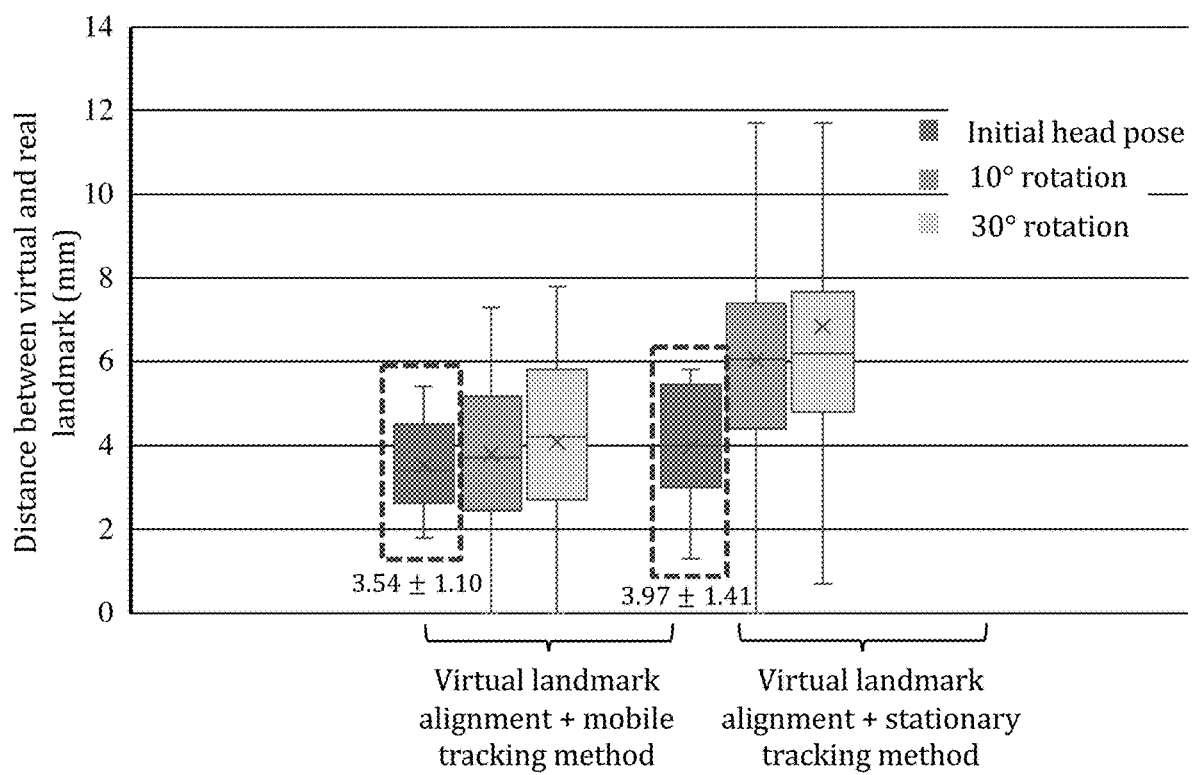
FIG. 7 is a plot of measured alignment accuracy with and without head motion+tracking.

FIG. 7 is a plot of measured alignment accuracy with and without head motion+tracking. More specifically, it shows the mean distance between real world landmarks and the corresponding virtual landmarks on the head surface of a mannequin after alignment of the virtual mannequin head to the real mannequin head. After initial alignment as described above, the real world mannequin head was tracked using mobile (left) and stationary (right) computer vision methods to preserve alignment of the virtual and real model even after the real mannequin head is rotated by 10° or 30° with respect to the initial pose.

The mean tracking error observed for the initial head pose, the head rotated by 10° and 30° for the two methods was as follows: (a) marker-based tracking with OST-HMD (optical see-through head mounted display) camera: 3.54±1.10 mm, 3.79±1.78 mm and 4.08±1.88 mm, (b) marker-based tracking with a world-anchored camera: 3.97±1.41 mm, 6.01±2.51 mm and 6.84±3.48 mm The dark box plot (highlighted by the dotted box) shows the distance measured for the initial head pose i.e., the manual alignment of virtual rendering of the head with the real world head using the AR device (3.54±1.10 mm and 3.97±1.41 mm for (a) and (b) respectively). The following two box plots show the error measured when the real-world head is rotated by ±10° and ±30° in yaw, pitch and roll and tracked by the respective tracking methods.

Thus the initial alignment results of FIG. 7 relate to alignment as described above in connection with FIGS. 1-4, and the results shown on FIG. 7 for ±10° and ±30° head motion relate to alignment+tracking as described above in connection with FIG. 5.

The invention claimed is:

1. A virtual-to-real alignment method comprising:
providing a virtual 3D model of a real-world object, wherein the virtual 3D model includes two or more virtual landmarks disposed at locations in the virtual 3D model that correspond to real-world landmarks of the real-world object;
viewing the real-world object through a see-through augmented reality (AR) device;
wherein the AR device is configured to display a virtual cursor superposed on the real-world object, wherein a displayed position of the cursor on the real-world object can be manually adjusted by a user, and wherein a location of the virtual cursor is known to the AR device;
for two or more of the virtual landmarks—manually positioning the virtual cursor on a corresponding real-world landmark of the real-world object as seen through the see-through AR display, followed by tagging to provide a virtual tag on the corresponding real-world landmark of the real-world object, wherein a location of the virtual tag is known to the AR device, whereby the AR device also knows the location where the user perceives the corresponding real-world landmark of the real-world object;

automatically aligning the virtual 3D model of the real-world object to the real-world object by relying at least partially on relating virtual landmarks to virtual tags that relate to the same real-world landmarks of the real-world object.

2. The method of claim 1, wherein the real-world object is a part of a patient's anatomy.

3. The method of claim 2, wherein the virtual 3D model is a corresponding 3D medical image of the patient.

4. The method of claim 2, wherein the 3D model is a generic anatomical model corresponding to the part of the patient's anatomy.

5. The method of claim 1, wherein the virtual tags are visible in the AR device.

6. The method of claim 1, wherein the cursor is provided by an AR controller configured to display a virtual pointer having the cursor at its tip.

7. The method of claim 1, further comprising tagging one or more locations on the real-world object with corresponding auxiliary virtual tags.

8. The method of claim 7, wherein the auxiliary virtual tags are used to document therapy.

9. The method of claim 1, further comprising tracking motion of the real-world object and providing a corresponding correction of alignment of the virtual 3D model of the object to the real-world object as viewed through the AR device.

10. The method of claim 9, wherein model dimensions for a model-based tracking approach are defined by the virtual tags.

11. The method of claim 1, wherein alignment of the virtual model to the real-world object is done by performing a landmark-based rigid registration.

12. The method of claim 1, wherein alignment of the virtual model to the real-world object is done by performing a landmark-based affine registration.

13. The method of claim 1 wherein an initial alignment of the virtual model to the real-world object is done by performing a landmark-based rigid or affine registration, and wherein the initial alignment is further refined by the user by moving the virtual model with a user interface of the AR device.

14. The method of claim 1 wherein a controller of the AR device is user hand and/or fingers and wherein the virtual cursor is related to user hand and/or finger position.

* * * * *